United States Patent [19]
Stover

[11] Patent Number: 5,469,603
[45] Date of Patent: Nov. 28, 1995

[54] FIBER REDUCER RECIPROCATING CONVEYOR HAVING AN IMPROVED BEARING ASSEMBLY

[75] Inventor: Jimmy R. Stover, Walters, Okla.

[73] Assignee: Western Steel, Inc., Corpus Christi, Tex.; a part interest

[21] Appl. No.: 158,632

[22] Filed: Nov. 26, 1993

[51] Int. Cl.⁶ ............................. D01G 7/00; B65G 25/04
[52] U.S. Cl. ................... 19/80 R; 198/750.4; 414/525.1
[58] Field of Search .................. 19/80 R, 81; 198/750; 414/525.1, 525.9; 241/64, 237, 280

[56] References Cited

U.S. PATENT DOCUMENTS

| | | | |
|---|---|---|---|
| 4,580,678 | 4/1986 | Foster | 198/750 |
| 4,611,708 | 9/1986 | Foster | 414/525.9 X |
| 4,679,686 | 7/1987 | Foster | 198/750 |
| 4,709,805 | 12/1987 | Foster | 198/750 |
| 4,785,929 | 11/1988 | Foster | 198/750 |
| 4,823,938 | 4/1989 | Foster | 198/750 |
| 4,966,275 | 10/1990 | Hallstrom, Jr. | 198/750 |
| 5,000,647 | 3/1991 | Foster | 414/525.9 |
| 5,125,502 | 6/1992 | Foster | 198/750 |
| 5,340,264 | 2/1994 | Quaeck | 198/750 X |
| 5,355,994 | 10/1994 | Foster | 414/525.1 X |

*Primary Examiner*—John J. Calvert
*Attorney, Agent, or Firm*—G. Turner Moller

[57] ABSTRACT

A fiber bundle reducer such as a cotton module feeder includes a feeder bed incorporating a reciprocating slat conveyor. A module carrying truck drives onto the slat conveyor and unloads a seed cotton module. In one embodiment, a ramp allows the truck to drive onto the slat conveyor. In another embodiment, the slat conveyor is positioned in a pit so the slats are at ground level. In a third embodiment, the slat conveyor is inclined. The conveyor preferably continues to operate as the truck unloads the module. A bearing construction allows removal and replacement of the load supporting bearings without removing the slats. Another bearing construction between adjacent slats allows the construction of longer conveyors.

15 Claims, 3 Drawing Sheets

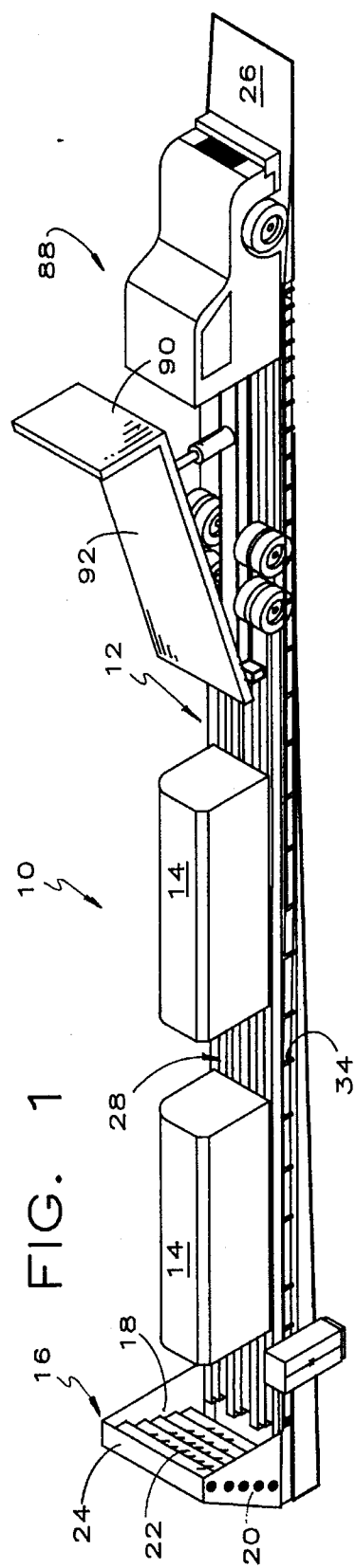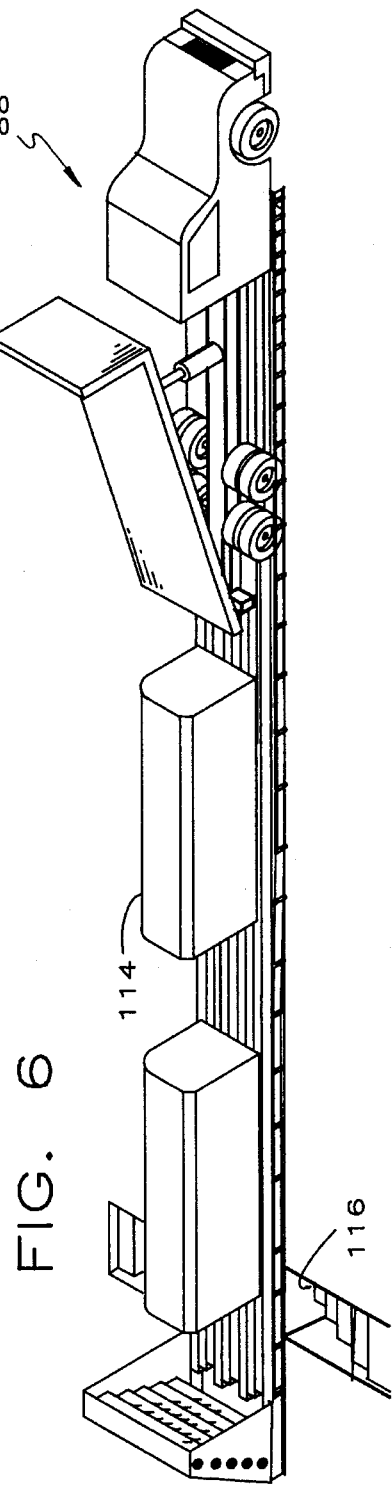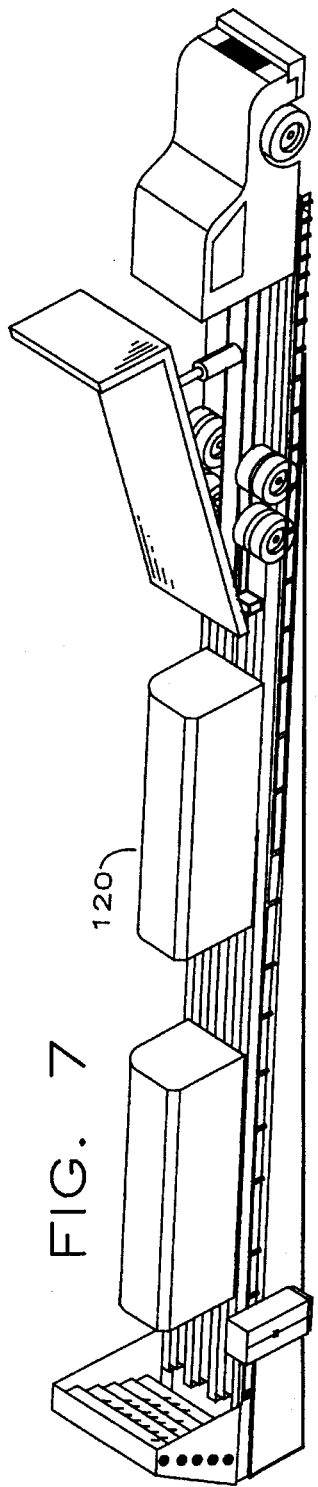

1

FIBER REDUCER RECIPROCATING CONVEYOR HAVING AN IMPROVED BEARING ASSEMBLY

This invention relates to a fiber bundle reducer such as a cotton module feeder and improved reciprocating conveyors which are adapted for use in cotton handling equipment.

The handling of seed cotton from the field to the gin has recently changed dramatically. Past practice was to dump a picker or stripper container into a cotton trailer, tow the trailer to the gin and leave it until the trailer was emptied into the gin inlet and the cotton ginned. Recently, cotton module makers have become popular. Module makers receive seed cotton on the edge of a field and compress it into a large bundle called a module. A plastic cover is usually placed on top of the module to shed water. After a while, the module is transported to the gin in a large open backed truck and either unloaded onto a module feeder or onto the ground for temporary storage.

When the gin is ready for a stored module, it is picked up by a module truck. In either case, a module truck unloads the module onto the feeder bed which moves the module into a feeder head where the module is broken up into small clumps of cotton fibers, seed and plant parts. These clumps are delivered to the gin for treatment in a conventional manner.

Conventional module trucks and beds of module feeders have substantially identical conveyors. These conveyors have universally been chains running across a support surface and having projections which embed in the bottom of the module so driving of the chain moves the module relative to the underlying support surface. Conventional feeder beds are constructed to be the same height as the truck bed. Thus, conventional module trucks back up to the bed of the module feeder, the chain conveyor of the truck is driven to discharge the module and the chain conveyor of the feeder bed is driven to receive and move the module toward the feeder head. Disclosures of prior art cotton module feeders are found in U.S. Pat. Nos. 4,497,085; 5,121,841 and 5,222,675.

Similar type equipment, known as bale openers, is used in textile mills for reducing ginned cotton bales to small cotton tufts or clumps upstream from a fiber spinning operation. Disclosures of prior art ginned cotton bale openers is found in U.S. Pat. No. 4,999,882. Similar equipment has been proposed for recycling fibers from bales of used materials, such as carpets and the like. As used herein, the term fiber bundle reducer is intended to include seed cotton module feeders, ginned cotton bale openers and devices for plucking used fibers from used fiber bales. This invention will be described in reference to seed cotton module feeders with the understanding that it is equally applicable to other fiber bundle reducers. Historically, fiber bale reducers have been fixed installations. It will be evident, however, that these may be portable or semiportable.

Reciprocating slat type conveyors are well known in the art and have reached a substantial degree of sophistication. These slat type conveyors comprise a plurality of elongate parallel slats mounted for reciprocating movement and arranged in at least three interleaved groups. Means are provided for reciprocating the groups so at least the majority are moving in the direction of intended travel. Movement of the conveyed article is either continuous or intermittent depending on the pattern of movement of the slats. The reciprocating slat conveyors of the prior art have been used extensively in the bottom of trailers to load or discharge the trailer contents and have been used in a variety of special purpose situations. Typical disclosures of prior art reciprocating slat conveyors are found in U.S. Pat. Nos. 2,629,504; 3,534,875; 4,143,760; 4,144,963; 4,184,587; 4,474,285; 4,580,678; 4,679,686; 4,709,805; 4,785,929; 4,793,469; 4,817,783; 4,823,938; 4,858,748; 4,966,275; 5,000,647; 5,125,502 and 5,165,524.

Reciprocating slat type conveyors are desirable for fiber bundle reducers because they are less expensive to manufacture than the chain conveyors now being used. In addition, maintenance requirements of slat type conveyors are considerably less than conventional chain conveyors. One would think it easy to make a feeder bed with a reciprocating slat conveyor simply by removing the chain conveyor and replacing it with a slat conveyor. This has not proved to be the case because the maximum forward speed of slat conveyors is quite low, usually less than ten feet per minute, while chain conveyors are capable of much higher speeds.

This speed difference is a complicating factor, especially when loading fiber bundles onto the feeder bed. In handling seed cotton modules, for example, the unloading speed of module trucks is variable but the slowest unloading speed is on the order of thirty feet per minute. Because of the speed mismatch, a chain conveyor module truck cannot discharge onto a feeder bed having a reciprocating slat conveyor. One cannot hope to succeed with a module feeder that does not accommodate all existing module trucks.

The first concept of this invention is to modify the slat conveyor so one simply drives the module truck onto, rather than up to, the feeder bed and discharges the module in the same manner the module is discharged onto the ground and then drives off. The same technique is useful on ginned cotton bale openers where the loading vehicle may be a fork lift or robotic arm. Superficially, this seems an elegant solution but there is a complication because people knowledgeable about reciprocating slat conveyors were of the opinion that the slat conveyor would either bog down and stop during unloading or the slats would continue to reciprocate and damage the rubber tires of the truck. It is important in most bundle reducing operations that the fiber bundle more-or-less continuously advances into the feeder head because the downstream operation is continuous. For example, in ginning seed cotton, the gin requires a more-or-less continuous supply of seed cotton. Similarly, in a fiber spinning operation, a more-or-less continuous supply of cotton is needed. Thus, a five minute delay in the fiber bundle reducer when a new bundle is being loaded is not acceptable. This invention was not known to be practical until a working model demonstrated that a modified slat conveyor continued to operate while receiving a full sized cotton module from a module truck. Thus, a module feeder of this invention will support a 30,000# cotton module and a 40,000# truck and continue to convey a partially consumed module toward the module feeder.

As will be more fully apparent hereinafter, it is preferred that the slat conveyor operate to continuously move the module toward the feeder head. It will be apparent, of course, that loading may be accomplished in an intermittent manner. Thus, in some circumstances, loading of the module may be done on an intermittently moving conveyor or on a stopped conveyor.

There are a variety of techniques to modify a feeder bed to receive a module truck. The feeder bed may be equipped with or adjacent to a ramp so the truck can drive onto the slat conveyor, the slat conveyor may be tilted so the truck can drive directly onto it, the slat conveyor may be built at ground level over a pit, or the like. In this fashion, a reciprocating slat type conveyor becomes compatible with all existing module trucks.

Another problem with slat conveyors, particularly those used in grimy or dusty environments of which cotton handling equipment is one, is bearing wear. One cannot do much about the dust and grime. Thus, the bearings of this invention are much more readily replaced than prior art slat bearings. The bearings can be replaced without removing the slats and, in a pinch, could be replaced without stopping operation of the conveyor.

Another limitation of slat conveyors is overall length. There are some situations where the distance to be conveyed is longer than is practical with conventional slat conveyors. One aspect of the length limitation is that it is difficult to push long slats because they bow in compression, bind against an adjacent slat and create large frictional forces the drive cannot readily cope with. In very long slat type conveyors, axial load carrying bearings are provided between adjacent slats.

It is an object of this invention to provide an improved fiber bale reducer.

Another object of this invention is to provide an improved fiber bundle reducer having improved means of loading the bundle onto a reciprocating slat conveyor.

A further object of this invention to provide an improved reciprocating conveyor.

Another object of this invention is to provide a reciprocating conveyor which is particularly adapted for use in cotton handling equipment.

A further object of this invention is to provide a reciprocating conveyor having improved bearing means.

A still further object of this invention is to provide a method for using a reciprocating conveyor.

These and other objects and advantages of this invention will become more fully apparent as this description proceeds, reference being made to the accompanying drawings and appended claims.

IN THE DRAWINGS

FIG. 1 is an isometric view of one embodiment of a module feeder of this invention;

FIG. 6 is a cross-sectional view of another embodiment of a module feeder of this invention; and FIG. 7 is an isometric view of another embodiment of a module feeder of this invention.

Figure 2:
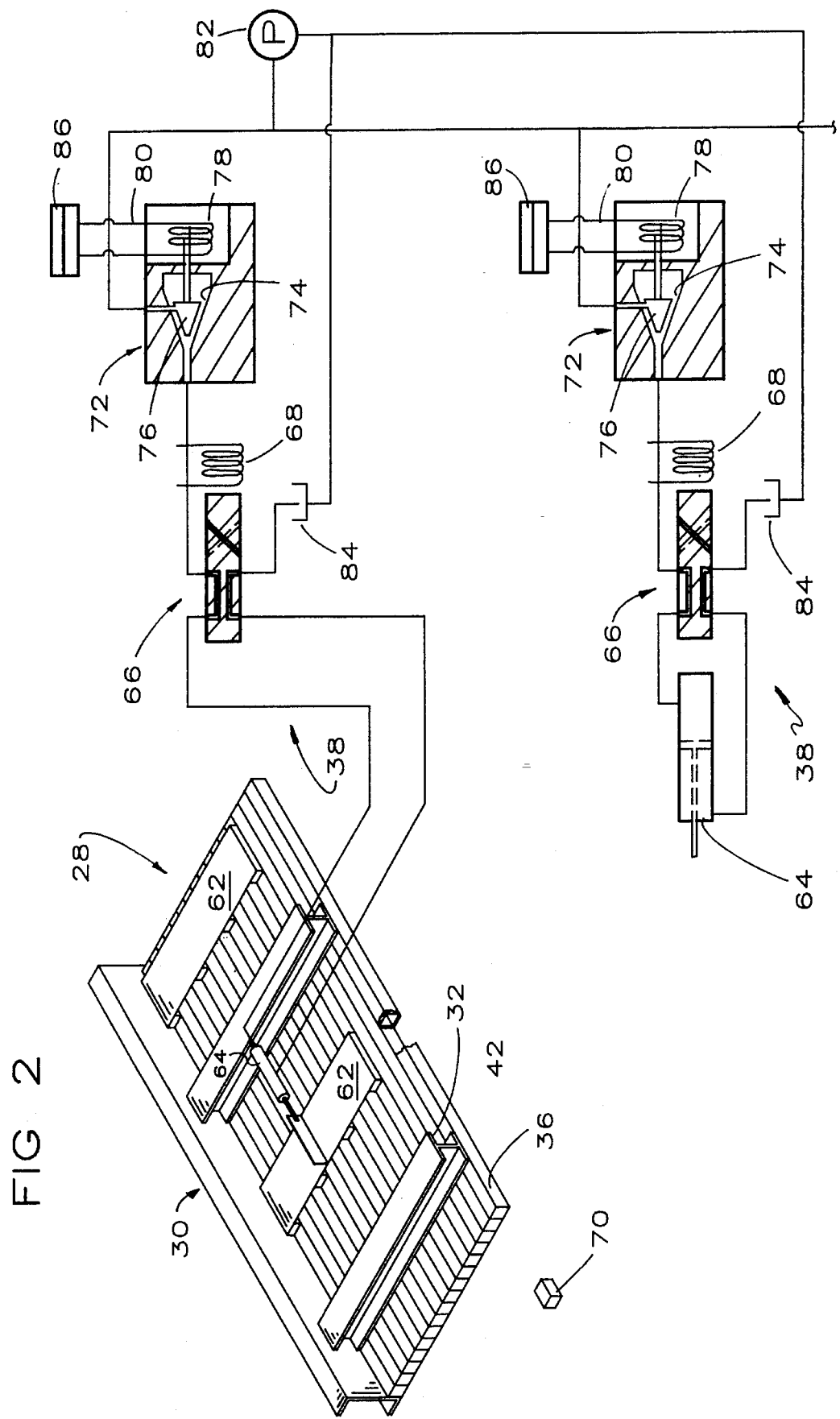
FIG. 2 is a partially schematic, partially isometric view of the underside of a reciprocating conveyor of this invention, certain parts being broken away for clarity of illustration.

Referring to FIGS. 1–5, a cotton module handling system or feeder 10 comprises a feeder bed 12 delivering seed cotton modules 14 into a feeder head 16 of either the stationary or traveling type where the modules 14 are broken up into clumps of cotton fiber and seed. These clumps are transported to a gin (not shown) where the cotton is removed from the seed, plant stems, leaves and other trash and then baled for shipment to a compress or textile mill. The seed is also separated for sale and the trash collected for composting, burning or other disposal.

The feeder head 16 is of conventional design having a series of power driven disperser drums 18 which separate the modules 14 into a vast number of clumps of cotton fiber, seed, stems and leaves. Each disperser drum 18 includes a shaft 20 extending transversely across the feeder head 16, means (not shown) for drivably rotating the shaft 20 and a series of discs, fingers, cutter heads 22 or the like extending away from the shaft 20. A hood 24 is open at the module inlet end for receiving the modules 14 and includes a discharge outlet (not shown) for delivering the clumps to the gin. Those skilled in the art will recognize the cotton module handling system 10, as heretofore described, as being typical of cotton module handling systems.

As shown in FIGS. 1–2, the feeder bed 12 incorporates a ramp 26 and a reciprocating slat conveyor 28 which is slightly inclined from the top of the ramp to the inlet of the feeder head 16. As shown in FIG. 2, the conveyor 28 includes a frame 30 comprising a plurality of horizontal H-beam supports 32 and legs 34 supporting a plurality of slats or conveyor members 36 for reciprocating movement to transport the module 14 toward the feeder head 16. A hydraulic drive system 38, as more fully described hereinafter, pushes and pulls the slats 36 in a predetermined pattern to move the cotton modules 14 toward the feeder head 16 in either an intermittent or continuous manner, preferably continuous.

The H-beams 32 provide a broad surface 42 supporting the slats 36. As shown best in FIG. 3, a bearing 44 is fixed to the upper surface of the H-beam 32 and comprises a pair of bearing sections 46, 48 separated by a parting line 50 into mirror image halves. The H-beams 32 are transverse to the direction of travel of the module 14 and the parting line 50 is parallel to the H-beams 32 The bearing sections 46, 48 comprise a thick sheet or plate of bearing material such as NYLON MD or other similar material abutting and supporting the slats 36. The bearing sections 46, 48 provide a fastener slot 52 communicating with the parting line 50 including an enlarged upper end 54 and a reduced lower end 56 receiving a carriage bolt 58. Either the lower slot end 56 or the opening through the H-beam 32 prevents rotation of the carriage bolt 58 during threading and unthreading of the nut 60.

It will be seen that the bearing sections 46, 48 may be replaced in a simple fashion without removing the slats 36. The slats 36 may be raised by placing a wooden beam under them and jacking the assembly off the floor to remove the load from a worn bearing 44. The nuts 60 are loosened or removed and the worn bearing sections 46, 48 removed by slidably moving them away from the carriage bolts 58 as allowed by the fastener slots 52. New bearing sections 46, 48 are installed in the reverse manner.

Figure 3:
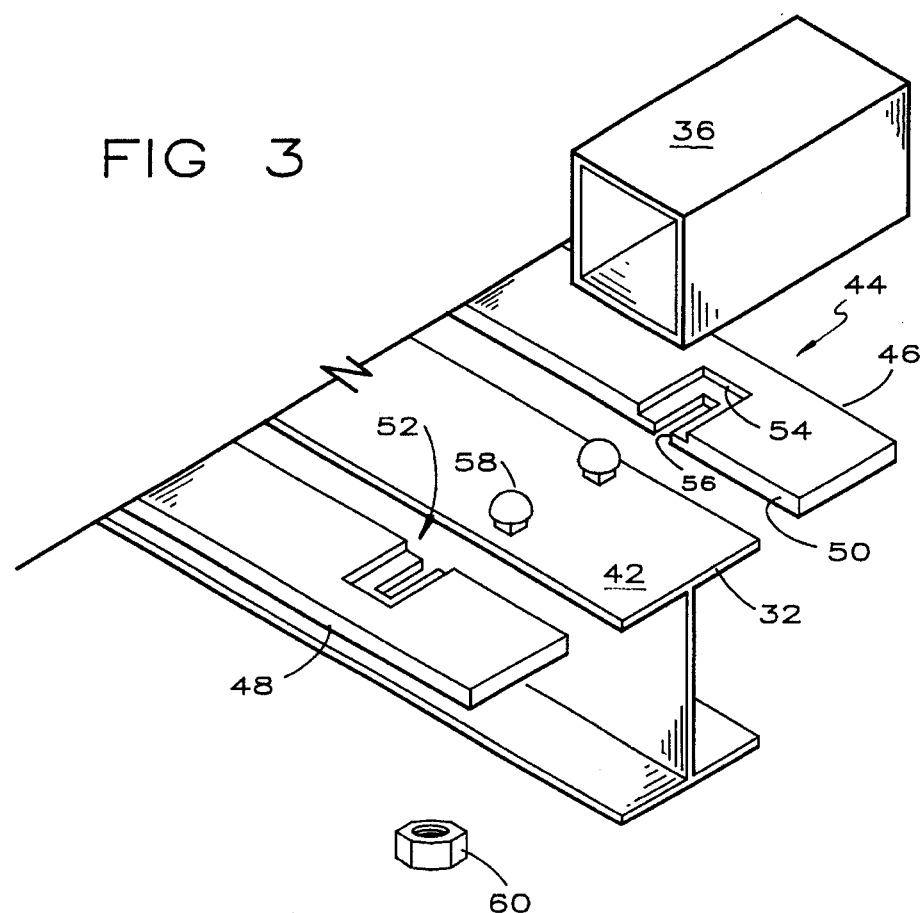
FIG. 3 is an exploded isometric view of a bearing construction of this invention.

The slats 36 may be of any suitable size and shape. As shown in FIGS. 2–3, the slats 36 are preferably simple square tubing of high strength metal such as steel or aluminum.

As shown in FIG. 2, the conveyor 28 is divided into groups of at least three and preferably four interleaved slats 36. Each of the groups is connected by a transverse tie bar 62. The hydraulic drive system 38 includes a plurality of linear hydraulic motors 64, one connected to each of the tie bars 62. The drive system 38 includes a reversing valve 66 of any suitable type. Typically, the reversing valve 66 includes a solenoid operator 68 having a pair of microswitches 70 mounted at opposite ends of travel of the group of slats 36 connected by the tie bar 62. A proportioning valve 72 is of a sophisticated type having a tapered metering passage 74, a movable tapered flow restrictor 76 and an electromagnetic operator 78 for positioning the restrictor 76 in a predetermined location to meter fluid flow from the valve 72 in response to a signal on the output wires 80. Although the valve 72 may be of any suitable type, an acceptable version is Model PVG32157H4647 from Danfoss Corp. of Racine, Wis. A single pump 82 delivers high pressure hydraulic fluid to the series of proportioning valves 72 and has its suction in communication with a return reservoir 84.

Operation of the hydraulic drive system 38 is now apparent. High pressure hydraulic fluid passes through the proportioning valve 72 at a rate dictated by the signal on the wires 80 to drive the cylinder 64, the tie bar 62 and the slats 36 connected thereto in the advance direction. When the slats 36 reach the end of their stroke, the microswitch 70 (FIG. 2) is bumped to trip the solenoid 68 and reverse the valve 66 and thereby drive the slats 36 in the opposite or retracting direction. As is known in the art, to produce movement of the module 14 toward the feeder head 16, i.e. in the advance direction, the majority of slats 36 must move in the advance direction at any one time or be stopped. To produce continuous movement of the module 14 as is preferred, as opposed to intermittent movement, it is desirable to move the slats 36 faster in the retracting direction than in the advance direction. To this end, a controller 86 delivers appropriate signals through the wires 80 to the various proportioning valves 72 to control the speed of the slats 36 of the various groups.

Operation of the module feeder 10 will now be apparent. It is desirable that a module 14 always be at the disperser drums 18 so cotton clumps are continuously delivered to the gin. When the module 14 currently being worked is reduced to a certain size, a new module is delivered onto the feeder bed 12. As shown in FIG. 1, the truck 88 backs up the ramp 26 onto the feeder bed 12 while the slats 36 are being reciprocated by the hydraulic drive system 38. The feeder bed 12 is sufficiently strong to carry the load and the hydraulic drive system 38 is sufficient to reciprocate the slats 36 in their normal manner while the truck 88 is on the feeder bed 12. The truck 88 backs up to the module 14 being worked on and discharges a new module in the same manner that modules are now discharged upon the ground, i.e. the operator tilts the truck bed 90, starts the truck chain conveyor 92 in the discharge direction and then drives off the feeder bed 12 leaving the module 14 on the feeder bed 12.

Figure 4:
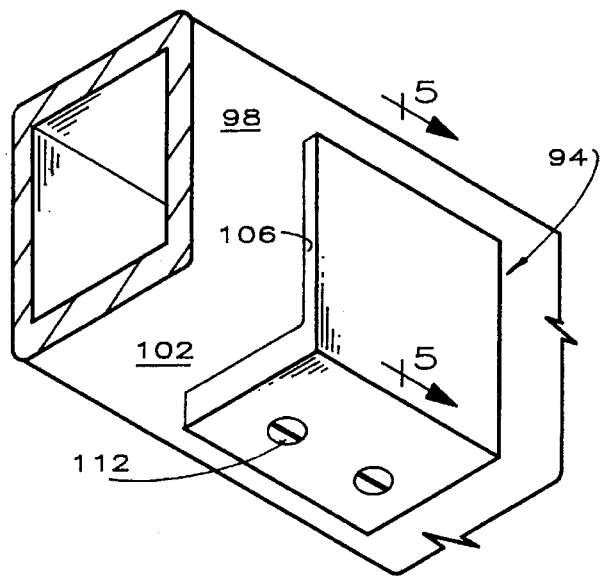
FIG. 4 is an isometric view of an axial bearing of this invention.
Figure 5:
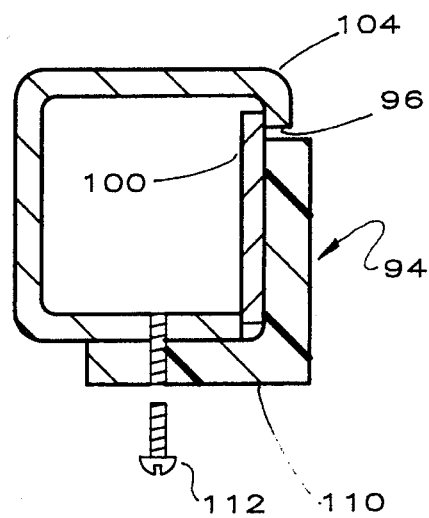
FIG. 5 is a cross-sectional view of the axial bearing of FIG. 4, taken substantially along line 5—5 thereof as viewed in the direction indicated by the arrows.

Referring to FIGS. 4–5, another feature of this invention is illustrated. Prior art slat conveyors have a definite limit on the length of the conveyors because the hydraulic drive 38, at some time, must push the slats 36. When the slats 36 are very long, they have a tendency to bow and come into substantial frictional contact with adjacent slats 36. To overcome or mitigate this problem, a plurality of axial bearings 94 are provided on the slats 36. As shown best in FIG. 5, a vertical window 96 is cut in the sidewall 98 of the slat 36. A section 100 is welded to the bottom wall 102 and corner 104 to provide a recess 106 in the slat 36 while preserving the strength of the slat.

A bearing 94 comprises a relatively thick angle 110 of bearing material such as NYLON MD or such bearing material bonded to a metal angle. The angle 110 is removably secured to the slat 36 in any suitable manner, as by one or more fasteners 112 extending from the bottom into the bottom wall 102 of the slat 36. It will be seen that the bearing material extends beyond the side of the side wall 98 to abut the adjacent slat 36. The bearings 94 are placed axially along the slats 36 so any slat 36 rubs against the bearing 94 of the next adjacent slat.

Referring to FIG. 6, another embodiment of this invention is illustrated. In FIG. 1, the module truck 88 backs onto a ramp 26 providing access to the feeder bed 12. In FIG. 6, the feeder bed 114 is more-or-less horizontal and is installed at ground level over a pit 116. Those components of the reciprocating conveyor 118 that are necessarily under the feeder bed 114 are located in the pit 116.

Referring to FIG. 7, another embodiment of this invention is illustrated. In FIG. 1, the module truck 88 backs onto a ramp 26 providing access to the feeder bed 12 which is slightly inclined so the reciprocating conveyor 28 moves the modules 14 slightly uphill to the inlet of the feeder head 16. In FIG. 7, the feeder bed 120 is all above ground level but is tilted slightly more than the feeder bed 12 in FIG. 1 so the ramp 26 may be eliminated.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A fiber bundle reducer comprising a feeder head for separating a fiber bundle into a multiplicity of clumps of fiber;

means for moving the fiber bundle relative to the feeder head including a reciprocating conveyor having a frame providing a plurality of support members, a plurality of elongate side-by-side slats and a planar bearing slidably supporting the slats on the support members for reciprocating movement and having at least one fastener slot opening into an edge of the bearing, the fastener slot defining a path of removal and installation movement of the bearing relative to the fastener; a removable fastener securing the bearing to the support member including a first member extending through the slot and through the support member; and means for holding the first member against rotation, means for reciprocating the slats, the slats being constantly in contact with the bearings; and means for supporting a truck for movement onto the reciprocating conveyor for discharging a fiber bundle onto the slats.

2. The fiber bundle reducer of claim 1 wherein the reciprocating conveyor is above ground level and includes an outlet end adjacent the feeder head and an inlet end, the supporting means comprises a ramp extending from ground level to the inlet end of the reciprocating conveyor.

3. The fiber bundle reducer of claim 1 wherein the reciprocating conveyor includes an outlet end, adjacent the feeder head, above ground level and an inlet end at ground level, the reciprocating conveyor being inclined between the inlet end and the outlet end.

4. The fiber bundle reducer of claim 1 wherein the reciprocating conveyor frame is below ground level and the slats are at ground level.

5. The fiber bundle reducer of claim 1 wherein the bearing comprises first and second coplanar bearing sections divided along a parting line, each of the bearing sections having at least one fastener slot opening into the parting line, the fastener slot defining a path of removal and installation movement of the bearing section relative to the fastener; first and second fasteners securing the first and second bearing sections to the support members including a first member extending through the slot and through the support member.

6. The fiber bundle reducer of claim 5 wherein the support provides a polygonal opening therethrough and the fastener comprises a carriage bolt received in the polygonal opening, the means for holding the fastener against rotation comprising the relationship between the polygonal opening and the carriage bolt.

7. A fiber bundle reducer comprising a feeder head for separating a fiber bundle into a multiplicity of clumps of fiber; means for moving the fiber bundle relative to the feeder head including a reciprocating conveyor having a frame providing a plurality of bearings, a plurality of elongate side-by-side slats supported on the bearings for reciprocating movement and including an axially extending upright wall providing a series of axially spaced recesses and a bottom wall, a plurality of axial bearings for sliding the slats against adjacent slats and including at least some of the recesses between adjacent slats having an L-shaped bearing providing a first section in the recess extending laterally beyond the upright wall and a second section juxtaposed to the bottom wall and means securing the second section to the bottom wall, means for reciprocating the slats, the slats being constantly in contact with the bearings; and means for supporting a truck for movement onto the reciprocating conveyor for discharging a fiber bundle onto the slats.

8. The fiber bundle reducer of claim 7 wherein the sole connection between the L-shaped bearing and the slat is through the bottom wall.

9. A reciprocating conveyor for conveying material in a predetermined direction of travel comprising:

a frame comprising a plurality of support members;

a plurality of elongate side-by-side slats carried by the support members;

means for reciprocating the side-by-side slats;

a planar bearing for slidably supporting the slats on the support members and having at least one fastener slot opening into an edge of the bearing, the fastener slot defining a path of removal and installation movement of the bearing relative to the fastener;

a removable fastener securing the bearing to the support member including a first member extending through the slot and through the support member; and means for holding the removable fastener against rotation.

10. The reciprocating conveyor of claim 9 wherein the bearing comprises first and second coplanar bearing sections divided along a parting line, each of the bearing sections having at least one fastener slot opening into the parting line, the fastener slot defining a path of removal and installation movement of the bearing section relative to the fastener; first and second fasteners securing the first and second bearing sections to the support members including a first member extending through the slot and through the support member.

11. The reciprocating conveyor of claim 10 wherein the support provides a polygonal opening therethrough and the fastener comprises a carriage bolt received in the polygonal opening, the means for holding the fastener against rotation comprising the relationship between the polygonal opening and the carriage bolt.

12. The reciprocating conveyor of claim 9 wherein the support members extend transverse to the direction of travel.

13. The reciprocating conveyor of claim 12 wherein the parting line extends transverse to the direction of travel.

14. A reciprocating conveyor for conveying material in a predetermined direction of travel comprising:

a frame comprising a plurality of support members;

a plurality of elongate side-by-side slats carried by the support members and having an axially extending upright wall providing a series of axially spaced recesses and a bottom wall;

a plurality of axial bearings for sliding the slats against adjacent slats and including at least some of the recesses between adjacent slats having an L-shaped bearing providing a first section in the recess extending laterally beyond the upright wall and a second section juxtaposed to the bottom wall and means securing the second section to the bottom wall; and means for reciprocating the side-by-side slats.

15. The reciprocating conveyor of claim 14 wherein the sole connection between the L-shaped bearing and the slat is through the bottom wall.

* * * * *